United States Patent
Araki et al.

(10) Patent No.: US 11,665,459 B2
(45) Date of Patent: May 30, 2023

(54) NOISE REDUCTION DEVICE

(71) Applicant: Panasonic Intellectual Property Management Co., Ltd., Osaka (JP)

(72) Inventors: Junji Araki, Osaka (JP); Shinichi Takayama, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/729,231

(22) Filed: Apr. 26, 2022

(65) Prior Publication Data

US 2022/0256267 A1    Aug. 11, 2022

Related U.S. Application Data

(63) Continuation of application No. 17/038,262, filed on Sep. 30, 2020, now Pat. No. 11,350,197, which is a
(Continued)

(30) Foreign Application Priority Data

Mar. 30, 2018    (JP) .............................. JP2018-069460

(51) Int. Cl.
*H04R 3/02*       (2006.01)
*G10L 21/02*      (2013.01)
(Continued)

(52) U.S. Cl.
CPC ......... *H04R 1/08* (2013.01); *G10K 11/17854* (2018.01); *G10L 21/02* (2013.01); *H04M 9/08* (2013.01); *H04R 3/02* (2013.01)

(58) Field of Classification Search
CPC . H04R 3/00; H04R 3/005; H04R 3/02; H04R 3/04; H04R 1/08; H04R 1/1083;
(Continued)

(56) References Cited

U.S. PATENT DOCUMENTS 5,251,263 A  *  10/1993  Andrea ............ G10K 11/17885
                                                    381/71.7
5,353,348 A     10/1994  Sendyk
(Continued)

FOREIGN PATENT DOCUMENTS

DE   102017206788 B3 *  8/2018   ......... G10L 21/0208
JP       H695693 A   *  4/1994   ............... G10L 3/02
(Continued)

OTHER PUBLICATIONS

JPH695693A English Translation, Fujimoto Shoji, Date Apr. 1994.*
(Continued)

*Primary Examiner* — Thang V Tran
(74) *Attorney, Agent, or Firm* — Wenderoth, Lind & Ponack, L.L.P.

(57) ABSTRACT

A noise reduction device includes a processor that converts a noise signal collected by a microphone disposed in a control space into a noise signal in a frequency domain, a storage that stores the converted noise signal in the frequency domain as a reference signal, and a signal generator that generates a noise reduction signal for reducing the noise signal collected by the microphone at a control position of the control space. The processor determines whether or not the noise signal is non-stationary noise based on a frequency characteristic of the converted noise signal in the frequency domain and a frequency characteristic of the reference signal. When it is determined that the noise signal is the non-stationary noise, the processor controls the signal generator so as to cancel generation of the noise reduction signal.

10 Claims, 6 Drawing Sheets

Related U.S. Application Data continuation of application No. PCT/JP2019/006660, filed on Feb. 21, 2019.

(51) Int. Cl.
 *G10K 11/16* (2006.01)
 *H04R 1/08* (2006.01)
 *H04M 9/08* (2006.01)
 *G10K 11/178* (2006.01)

(58) Field of Classification Search
 CPC . H04R 2499/13; H04R 2410/05; G10L 21/02; G10L 21/0208; G10L 21/0216; G10L 21/02161; G10K 11/16; G10K 11/175; G10K 11/1781; G10K 11/17819; G10K 11/17821; G10K 11/17823; G10K 11/17825; G10K 11/17835; G10K 11/17854; G10K 11/17879; G10K 11/17881; G10K 11/17813; G10K 11/17815; G10K 11/17817; H04M 9/08
 See application file for complete search history.

(56) References Cited

U.S. PATENT DOCUMENTS

| | | | | |
|---|---|---|---|---|
| 6,847,723 | B1* | 1/2005 | Kiuchi | G01C 21/3608 381/71.11 |
| 7,440,891 | B1* | 10/2008 | Shozakai | H04R 3/02 704/226 |
| 7,697,696 | B2* | 4/2010 | Okumura | H04R 3/02 381/71.11 |
| 7,890,321 | B2* | 2/2011 | Ichikawa | G10L 21/0208 704/226 |
| 9,728,178 | B2* | 8/2017 | Sugiyama | H04M 9/082 |
| 10,580,399 | B1 | 3/2020 | Bastyr | |
| 2006/0136203 | A1* | 6/2006 | Ichikawa | G10L 21/0208 704/226 |
| 2006/0188107 | A1 | 8/2006 | Inoue | |
| 2007/0076896 | A1 | 4/2007 | Hosaka et al. | |
| 2008/0181392 | A1 | 7/2008 | Zad-Issa | |
| 2008/0317254 | A1 | 12/2008 | Kano | |
| 2009/0003586 | A1 | 1/2009 | Lai | |
| 2011/0222698 | A1 | 9/2011 | Asao | |
| 2012/0127341 | A1 | 5/2012 | Han | |
| 2013/0272540 | A1 | 10/2013 | Hgren | |
| 2014/0236582 | A1 | 8/2014 | Raychowdhury | |
| 2015/0356983 | A1* | 12/2015 | Tsujikawa | G10L 21/0208 704/226 |
| 2016/0195606 | A1 | 7/2016 | Sugino | |
| 2019/0027128 | A1 | 1/2019 | Araki et al. | |

FOREIGN PATENT DOCUMENTS

| | | | |
|---|---|---|---|
| JP | 07-064573 | 3/1995 | |
| JP | 09-101789 | 4/1997 | |
| JP | 2007-093962 | 4/2007 | |
| JP | 4183338 B2 * | 11/2008 | ............... H04R 3/00 |
| JP | 2011-002481 | 1/2011 | |
| JP | 2015-045766 | 3/2015 | |
| WO | WO1997010586 A1 * | 3/1997 | ............... G10L 3/03 |
| WO | 2017/170321 | 10/2017 | |

OTHER PUBLICATIONS

JP4183338B2 English Translation, Nakada K, Date Nov. 2008.*
International Search Report dated May 7, 2019 in International (PCT) Application No. PCT/JP2019/006660 with English translation.

* cited by examiner

NOISE REDUCTION DEVICE

BACKGROUND

1. Field of the Present Disclosure

The present disclosure relates to a noise reduction device that reduces a level of noise generated in a stationary manner in a surrounding environment.

2. Description of the Related Art

WO2017/170321 discloses a technique in which a noise control unit generates a control sound signal for reducing noise detected by a plurality of noise microphones in a control target space in an aircraft where a noise reduction device including the plurality of noise microphones, the noise control unit, and a control speaker is installed. An object of the present disclosure is to provide a noise reduction device that adaptively detects non-stationary noise generated in a non-stationary manner in a control space of an aircraft or the like, other than stationary noise generated therein in a stationary manner, and effectively prevents deterioration in accuracy of stationary noise reduction processing.

SUMMARY

The present disclosure provides a noise reduction device, including a processor that converts a noise signal collected by a microphone provided in a control space into a noise signal of a frequency domain, a storage that stores the converted noise signal of the frequency domain as a reference signal, and a signal generator that generates a noise reduction signal for reducing the noise signal collected by the microphone at a control position of the control space. The processor determines whether or not the noise signal collected by the noise microphone is non-stationary noise generated in a non-stationary manner in the control space, based on a frequency characteristic of the converted noise signal of the frequency domain, which is converted from the noise signal collected by the noise microphone, and a frequency characteristic of the reference signal, and when it is determined that the noise signal collected by the microphone is the non-stationary noise, the processor controls the signal generator so as to cancel generation of the noise reduction signal corresponding to the noise signal which is determined as the non-stationary noise and is collected by the microphone.

According to the present disclosure, it is possible to adaptively detect non-stationary noise generated in a non-stationary manner in a control space of an aircraft or the like, other than stationary noise generated therein in a stationary manner, and to effectively prevent deterioration in accuracy of stationary noise reduction processing.

DETAILED DESCRIPTION OF THE EXEMPLARY EMBODIMENTS

Background to Contents of First Embodiment

In the technique disclosed in Patent Literature 1, the noise collected by the noise microphones includes an engine sound generated due to operation of an engine, wind noise, an air conditioner sound, and the like, and stationary noise that is generated in the aircraft in a stationary manner (for example, an engine sound) is targeted.

Therefore, when noise generated in a non-stationary manner (specifically, non-stationary noise generated in a non-stationary manner, such as speaking voices of an occupant or a passenger in the aircraft and broadcasts in the aircraft) other than stationary noise is generated in the aircraft, it is considered difficult to effectively reduce noise in the control target space since frequency characteristics of the stationary noise and the non-stationary noise are different.

Therefore, in the following first embodiment, an example of noise reduction processing will be described, with which even when a large amount of non-stationary noise is generated in a control space of an aircraft or the like, influence thereof is suppressed and robustness is improved.

Hereinafter, embodiments specifically disclosing a noise reduction device according to the present disclosure will be described in detail with reference to the drawings. However, detailed descriptions more than necessary may be omitted. For example, a detailed description of a well-known matter or a repeated description for substantially the same configuration may be omitted. This is to avoid unnecessary redundancy in the following description and to facilitate understanding of those skilled in the art. It should be noted that the accompanying drawings and the following description are provided for a thorough understanding of the present disclosure for those skilled in the art, and are not intended to limit the subject matter recited in the claims.

In the following embodiments, a case where a noise reduction system, in which a noise reduction device according to the present disclosure is mounted, is installed in the vicinity of a passenger seat in a control space (for example, inside an aircraft) will be described as an example.

First Embodiment

Figure 1:
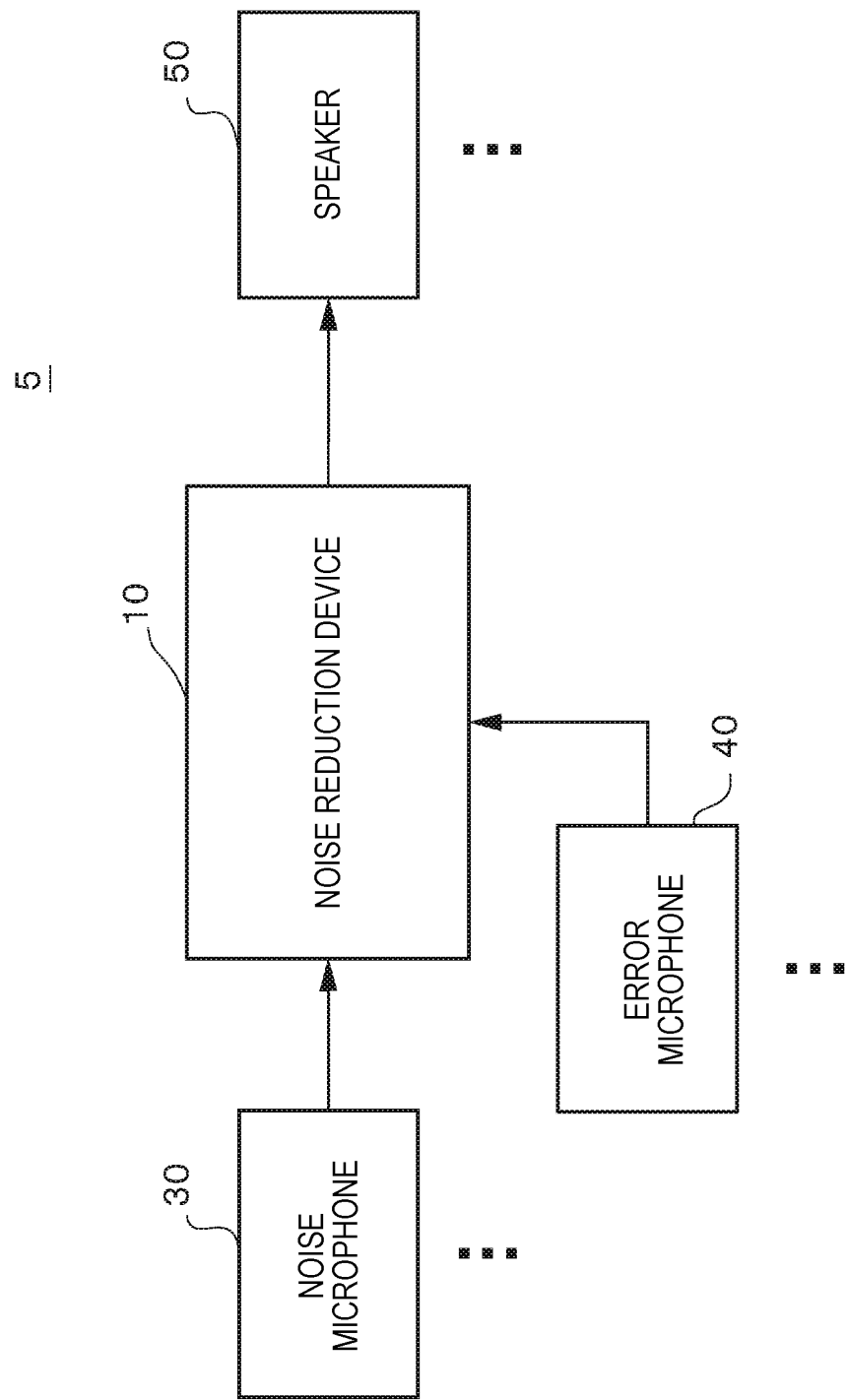
FIG. 1 is a diagram illustrating a system configuration example of a noise reduction system including a noise reduction device according to a first embodiment.

FIG. 1 is a diagram illustrating a system configuration example of a noise reduction system 5 including a noise reduction device 10 according to the first embodiment. The noise reduction system 5 includes the noise reduction device 10, a plurality of noise microphones 30, a plurality of error microphones 40, and a plurality of speakers 50. The noise reduction system 5 is installed in the vicinity of a passenger seat inside an aircraft, for example. The noise microphone 30 and the error microphone 40 may be arranged in any number as long as they are one or more. For example, the noise reduction system 5 may include sixteen noise microphones and four error microphones. The speaker 50 may be arranged in any number as long as it is one or more.

Figure 2:
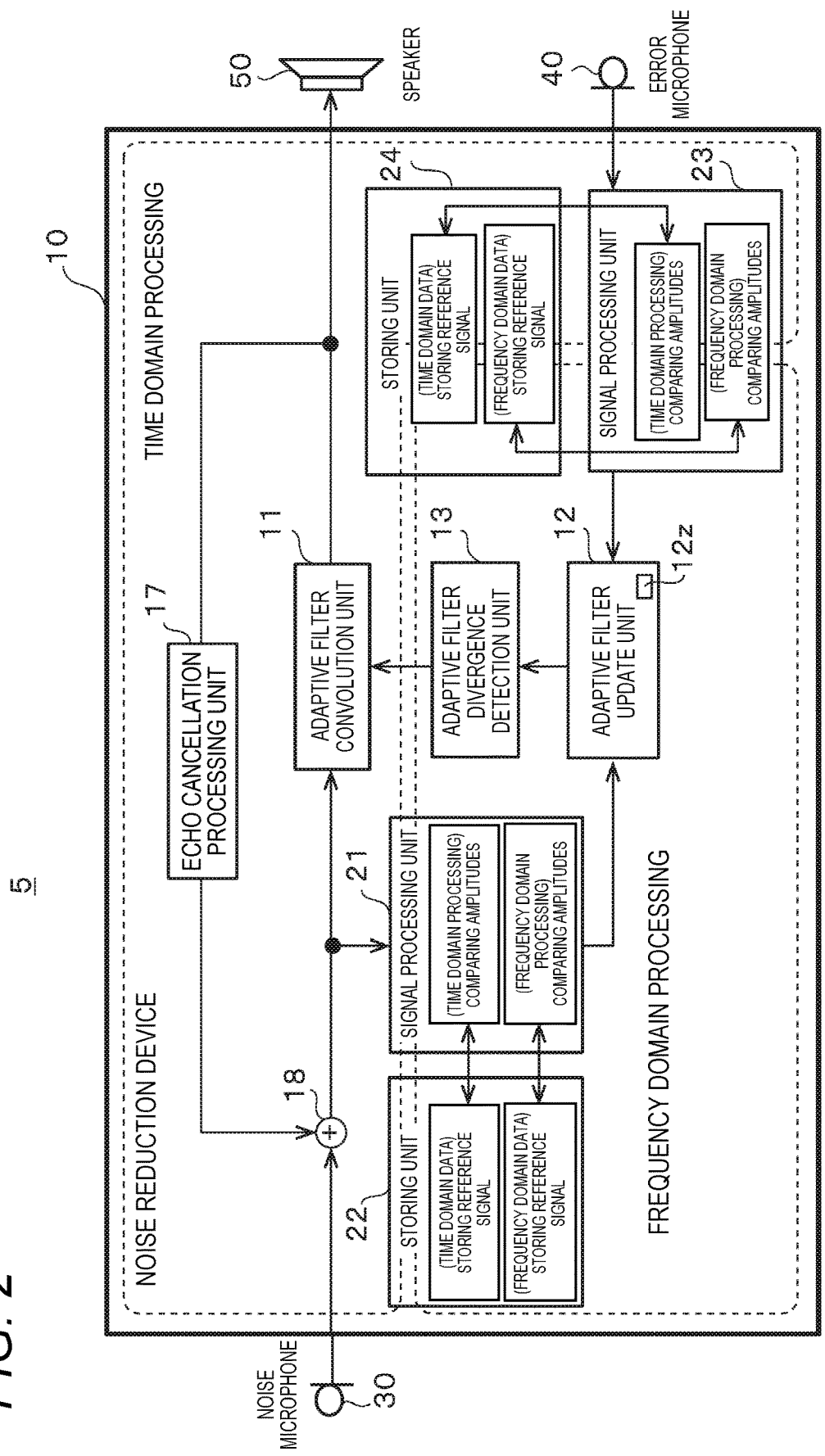
FIG. 2 is a block diagram illustrating an internal configuration example of the noise reduction device according to the first embodiment.

FIG. 2 is a block diagram illustrating an internal configuration example of the noise reduction device 10 according to the first embodiment. In the example illustrated in FIG. 2, a case where one noise microphone 30 and one error microphone 40 are provided in order to make the description easy to understand is illustrated. The noise microphone 30 and the error microphone 40 collect noise generated inside the aircraft (specifically, stationary noise and non-stationary noise). Here, the stationary noise is noise that is generated in a stationary manner inside the aircraft in flight, such as an engine sound or wind noise. The non-stationary noise is noise that is generated in a non-stationary manner inside the aircraft in flight (that is, a sound other than the above-described stationary noise, for example, a speech sound of an occupant or a passenger, broadcasts in the aircraft, and undesired noise and the like generated in the aircraft).

Figure 3:
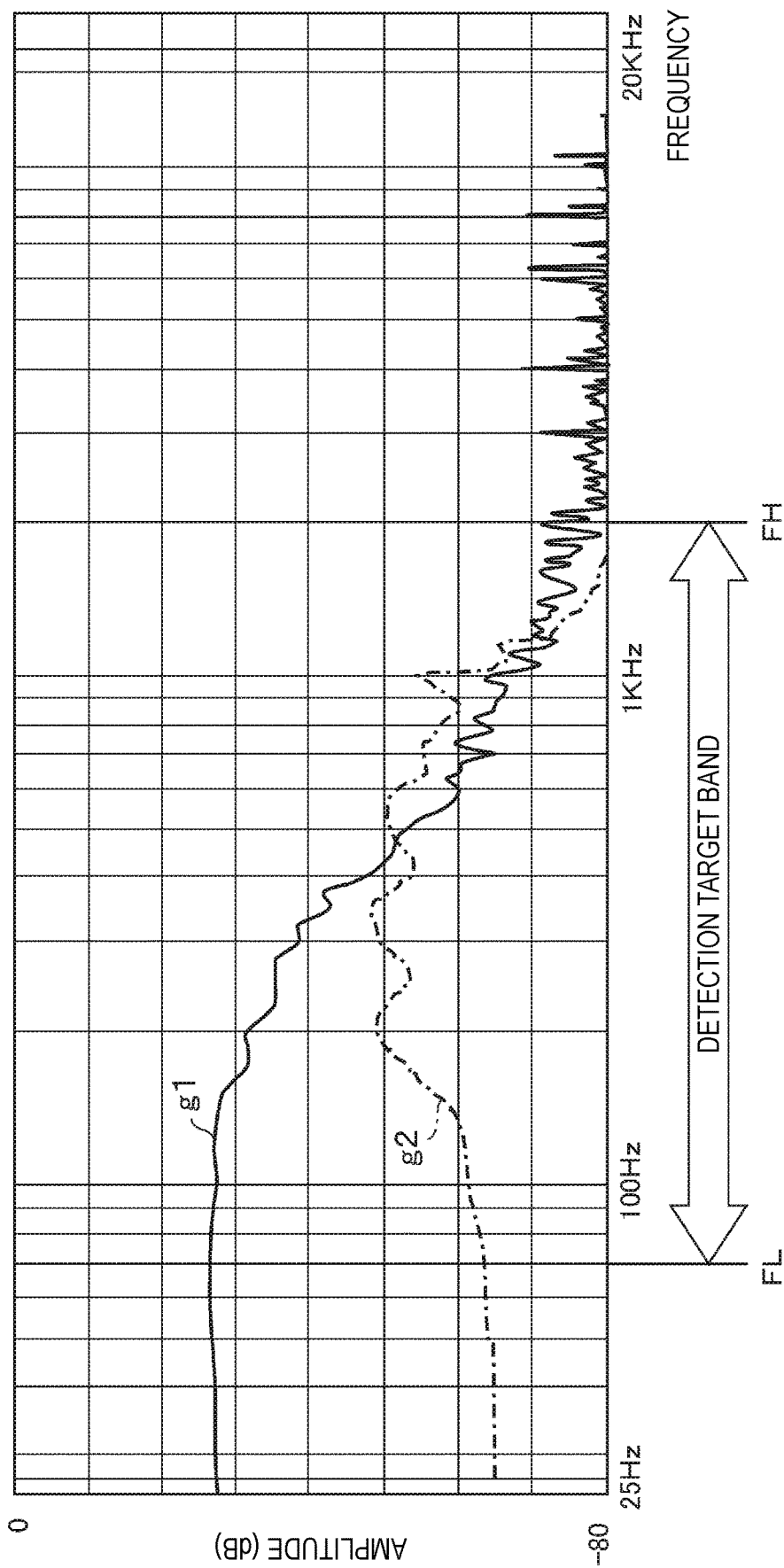
FIG. 3 is a graph illustrating an example of frequency characteristics of stationary noise and non-stationary noise.

Here, frequency characteristics of the stationary noise and the non-stationary noise will be described with reference to FIG. 3. FIG. 3 is a graph illustrating an example of frequency characteristics of the stationary noise and the non-stationary noise. A vertical axis of the graph of FIG. 3 indicates an amplitude (unit: dB) in a frequency domain of a noise signal. A horizontal axis of the graph of FIG. 3 indicates a frequency (unit: Hz).

The stationary noise has a characteristic that an amplitude thereof is large in a range from 25 Hz to 400 Hz and then gradually decreases, as indicated by a graph g1. On the other hand, the non-stationary noise has a characteristic that amplitude thereof is large in a range including 100 Hz to 300 Hz and is almost 0 in value in a region exceeding 2 kHz, as indicated by a graph g2.

In view of such characteristics, in the present embodiment, a detection target band (that is, a target range for detecting whether or not the non-stationary noise is detected in a noise signal collected by the noise microphone 30) is set up. For example, of the detection target band, a lower limit FL is set to 70 Hz, and an upper limit FH is set to 2 kHz. The detection target band may be set to a random band. In the example illustrated in FIG. 3, a reversal phenomenon occurs in the vicinity of 480 Hz that the amplitude of the non-stationary noise is larger than the amplitude of the stationary noise.

The noise reduction device 1 detects whether or not non-stationary noise is being generated in the detection target band, by comparing an amplitude in the frequency domain of the noise signal collected by the noise microphone 30 with an amplitude in a frequency domain of a reference signal (to be described below). Further, the noise reduction device 1 detects whether or not the non-stationary noise is being generated, by comparing a sound pressure level in a time domain of the noise signal collected by the noise microphone 30 with a predetermined threshold (for example, an average sound pressure level of a loud sound suddenly generated as non-stationary noise).

The noise reduction device 10 includes, for example, a digital signal processor (DSP), and performs adaptive noise suppression control (ANC: Active Noise Control) processing.

The noise microphone 30 is a microphone that collects noise generated from a noise source inside the aircraft, and converts air vibration transmitted to a sound receiving surface of the noise microphone 30 into an electric signal and outputs the electric signal.

The error microphone 40 is a microphone that collects a residual sound signal (an example of an error sound signal) in which a noise signal generated from a noise source inside the aircraft and a noise reduction sound signal (an example of a control sound signal) emitted from the speaker 50 are superimposed, and converts air vibration transmitted to a sound receiving surface of the error microphone 40 into an electric signal and outputs the electric signal.

The noise reduction device 10 performs ANC processing of generating, for the noise signal collected by the noise microphone 30, a sound signal having a phase inverted from that of the noise signal so that a sound signal collected by the error microphone 40 is minimized, and outputting the sound signal to the speaker 50 to cancel the noise signal. The noise reduction device 10 includes an adaptive filter convolution unit (adaptive filter) 11, an adaptive filter update unit (signal generator) 12, an adaptive filter divergence detection unit (divergence detector) 13, signal processing units (processor and second processor) 21 and 23, storing units (storage and second storage) 22 and 24, an echo cancellation processing unit 17, and an adder 18.

The adaptive filter convolution unit 11 performs convolution processing on the noise signal collected by the noise microphone 30 by using an adaptive filter in which a filter coefficient generated by the adaptive filter update unit 12 is set, and generates a noise reduction signal. The adaptive filter convolution unit 11 includes a multistage tap, and is configured using a finite impulse response (FIR) filter capable of freely setting a filter coefficient for each tap.

The adaptive filter update unit 12 periodically updates each filter coefficient of the adaptive filter convolution unit 11 based on noise signals collected by the noise microphone 30 and the error microphone 40 so that the residual sound signal (an example of the error sound signal) is minimized. The adaptive filter update unit 12 updates the filter coefficients in a case where the noise collected by the noise microphone 30 and the error microphone 40 is stationary noise, and interrupts (ie, omits or cancels) the update of the filter coefficients in a case where the noise is non-stationary noise. The adaptive filter update unit 12 includes a memory $12z$, and stores, in the memory $12z$, filter coefficients that are updated at the time stationary noise are detected at a previous time and before the previous time.

The adaptive filter divergence detection unit 13 functions as a fail-safe of filter coefficients that may diverge. When a filter coefficient updated by the adaptive filter update unit 12 is abruptly increased, the adaptive filter divergence detection unit 13 detects divergence of the filter coefficient (that is, a phenomenon of exceeding a predetermined upper limit value of the filter coefficient). When the divergence of the filter coefficient is detected, the adaptive filter divergence detection unit 13 stops an operation of the adaptive filter convolution unit 11. Accordingly, output from the speaker 50 is silence. In addition, when the divergence of the filter coefficient is detected, the adaptive filter divergence detection unit 13 may output a filter coefficient, which is stored in the storing unit 22 at a previous update, to the adaptive filter convolution unit 11. In this case, a control sound signal, which is subjected to the convolution processing based on the filter coefficient at the previous update, is output from the speaker 50.

The signal processing unit 21 determines whether a sound signal collected by the noise microphone 30 is stationary noise or non-stationary noise in the time domain and the frequency domain. If it is determined to be in the frequency domain, the signal processing unit 21 converts the noise signal collected by the noise microphone 30 into a noise signal of a frequency domain for each predetermined period by using a well-known technique. The signal processing unit 21 stores, in the storing unit 22, frequency domain data representing a frequency characteristic of the converted noise signal. Further, the signal processing unit 21 stores, in the storing unit 22, time domain data representing a temporal characteristic of a noise signal in a time domain which is collected by the noise microphone 30.

When the noise reduction device 10 is in an ON state, the signal processing unit 21 continues an operation of saving the frequency domain data and the time domain data of the noise signal collected by the noise microphone 30 in the storing unit 22 whether it is in operation or in stoppage of the ANC processing.

The storing unit 22 includes, for example, a random access memory (RAM), and updates the frequency domain data and the time domain data of the noise signal that is already stored therein. At this time, the storing unit 22 may store data of the noise signal of a certain time period or a certain amount (that is, frequency domain data and time domain data) in time series, and update the data so as to overwrite the oldest data. The storing unit 22 stores reference signals for the frequency domain data and the time domain data.

The reference signal is, for example, noise data at the time when stationary noise is collected by the noise microphone 30 in a state where stationary noise is generated and the ANC processing is turned off (that is, frequency domain data and time domain data). The reference signal of the frequency domain data includes noise in a band of, for example, 70 Hz to 2 KHz.

The noise signal collected by the noise microphone 30 may be collected for a plurality of times over a certain time period, and an average noise signal thereof may be used as the reference signal. Also, a noise signal obtained by one time of collection by the noise microphone 30 may be used as the reference signal. In addition, the reference signal is periodically updated. As the reference signal, a collected sound signal may be registered as it is, or a sound included in the band of 70 Hz to 2 KHz may be extracted and registered as the reference signal. Noise included in the band of 70 Hz to 2 KHz is a sound of a sound range in which non-stationary noise (such as voices of an occupant, or broadcasts in an aircraft) is likely to occur, and is a sound in an audible range which bothers a user. In addition, a reference signal used in the signal processing unit 21 and a reference signal used in the signal processing unit 23 may be the same or different. In a case of being the same, a noise signal collected by one of the noise microphone 30 and the error microphone 40 is used as the reference signal.

The signal processing unit 21 reads a frequency domain reference signal stored in the storing unit 22, and compares the frequency domain reference signal with frequency domain data of the noise signal input from the noise microphone 30. The signal processing unit 21 compares these sounds by sound intensity (for example, amplitude), and based on a comparison result, controls presence or absence of the operation of updating the filter coefficients by the adaptive filter update unit 12.

The signal processing unit 21 reads a time domain reference signal stored in the storing unit 22, and compares the time domain reference signal with time domain data of the noise signal input from the noise microphone 30. The signal processing unit 21 compares these sounds by sound intensity (for example, amplitude) to determine whether these sounds are non-stationary sounds (for example, a sudden sound, or silence due to occurrence of disconnection). Examples of the sudden sound include a sound generated by hitting a shell near the microphone, a rough sound of opening/closing a door, and the like. In addition, in a case of disconnection, only a weak sound of a low noise level is input from the noise microphone 30.

The signal processing unit 23 determines whether a sound signal collected by the error microphone 40 is stationary or non-stationary noise in the time domain and the frequency domain. If it is determined to be in the frequency domain, the signal processing unit 23 converts the sound collected by the error microphone 40 into a noise signal in a frequency domain for each predetermined period by using a well-known technique. The signal processing unit 23 stores, in the storing unit 24, frequency domain data representing a frequency characteristic of the converted noise signal. In addition, the signal processing unit 23 also stores, in the storing unit 24, time domain data representing a temporal characteristic of the noise signal.

When the noise reduction device 10 is in an ON state, the signal processing unit 23 continues an operation of saving the frequency domain data and the time domain data of the noise signal collected by the error microphone 40 in the storing unit 24 whether it is in operation or in stoppage of the ANC processing.

The storing unit 24 includes, for example, a RAM, and updates the frequency domain data and the time domain data of a sound signal that is already stored therein. At this time, the storing unit 24 may store data of the noise signal of a certain time period or a certain amount (that is, frequency domain data and time domain data) in time series, and update the data so as to overwrite the oldest data. The storing unit 24 stores reference signals for the frequency domain data and the time domain data.

The reference signal is, for example, noise data at the time when stationary noise is collected by the error microphone 40 in a state where stationary noise is generated and the ANC processing is turned off (that is, frequency domain data and time domain data). The frequency domain data includes noise in a band of, for example, 70 Hz to 2 KHz.

The noise signal collected by the error microphone 40 may be collected for a plurality of times over a certain time period, and an average noise signal thereof may be used as the reference signal; a noise signal obtained by one time of collection may be used as the reference signal. In addition, the reference signal is periodically updated. As the reference signal, a collected sound signal may be registered as it is, or sound included in the band of 70 Hz to 2 KHz may be extracted and registered as the reference signal. Noise included in the band of 70 Hz to 2 KHz is a sound of a sound range in which non-stationary noise (such as voices of an occupant, or broadcasts in an aircraft) is likely to occur, and is a sound in an audible range which bothers a user. In addition, the reference signal used in the signal processing unit 23 and the reference signal used in the signal processing unit 21 may be the same or different. In a case of being the same, a sound signal collected by one of the noise microphone 30 and the error microphone 40 is used as the reference signal.

The signal processing unit 23 reads a frequency domain reference signal stored in the storing unit 24, and compares the frequency domain reference signal with frequency domain data of the noise signal input from the error microphone 40. The signal processing unit 23 compares these sounds by sound intensity (for example, amplitude), and based on a comparison result, controls presence or absence of the operation of updating the filter coefficients by the adaptive filter update unit 12.

The signal processing unit 23 reads a time domain reference signal stored in the storing unit 24, and compares the time domain reference signal with time domain data of the noise signal input from the error microphone 40. The signal processing unit 23 compares these sounds by sound intensity (for example, amplitude) to determine whether these sounds are non-stationary sounds (for example, a sudden sound, or silence due to occurrence of disconnection). Examples of the sudden sound include a sound generated by hitting a shell near the microphone, a rough sound of opening/closing a door, and the like. In addition, in a case of disconnection, only a weak sound of a low noise level is input from the noise microphone 30.

The echo cancellation processing unit 17 generates a signal for cancelling a sound that is output from the speaker 50 with respect to a sound input from the noise microphone 30, in order to prevent a howling phenomenon caused by the sound output from the speaker 50 being input to the noise microphone 30.

The adder 18 adds an echo cancellation signal output from the echo cancellation processing unit 17 to the signal input to the noise microphone 30 to cancel the sound output from the speaker 50.

The speaker 50 receives a signal of a noise reduction sound (a control sound) output from the noise reduction device 10, converts the signal into sound waves, and outputs the sound waves. The speaker 50 outputs a control sound having a phase inverted from that of the noise so as to cancel noise reaching the vicinity of the user's ear.

Next, an operation of the noise reduction system 5 according to the first embodiment will be described with reference to FIG. 4.

The ANC processing by the noise reduction device 10 is performed, for example, assuming that the user is lying down in a full flat state. In this case, the speaker 50 is disposed near a floor or a seat in a state where the user is lying down in a full flat state or in a state where the seat is slightly tilted. The error microphone 40 is disposed near the user's ear or the speaker 50. The noise microphone 30 is disposed at a position away from the error microphone 40 (for example, an upper position of the seat on which the user is seated).

Figure 4:
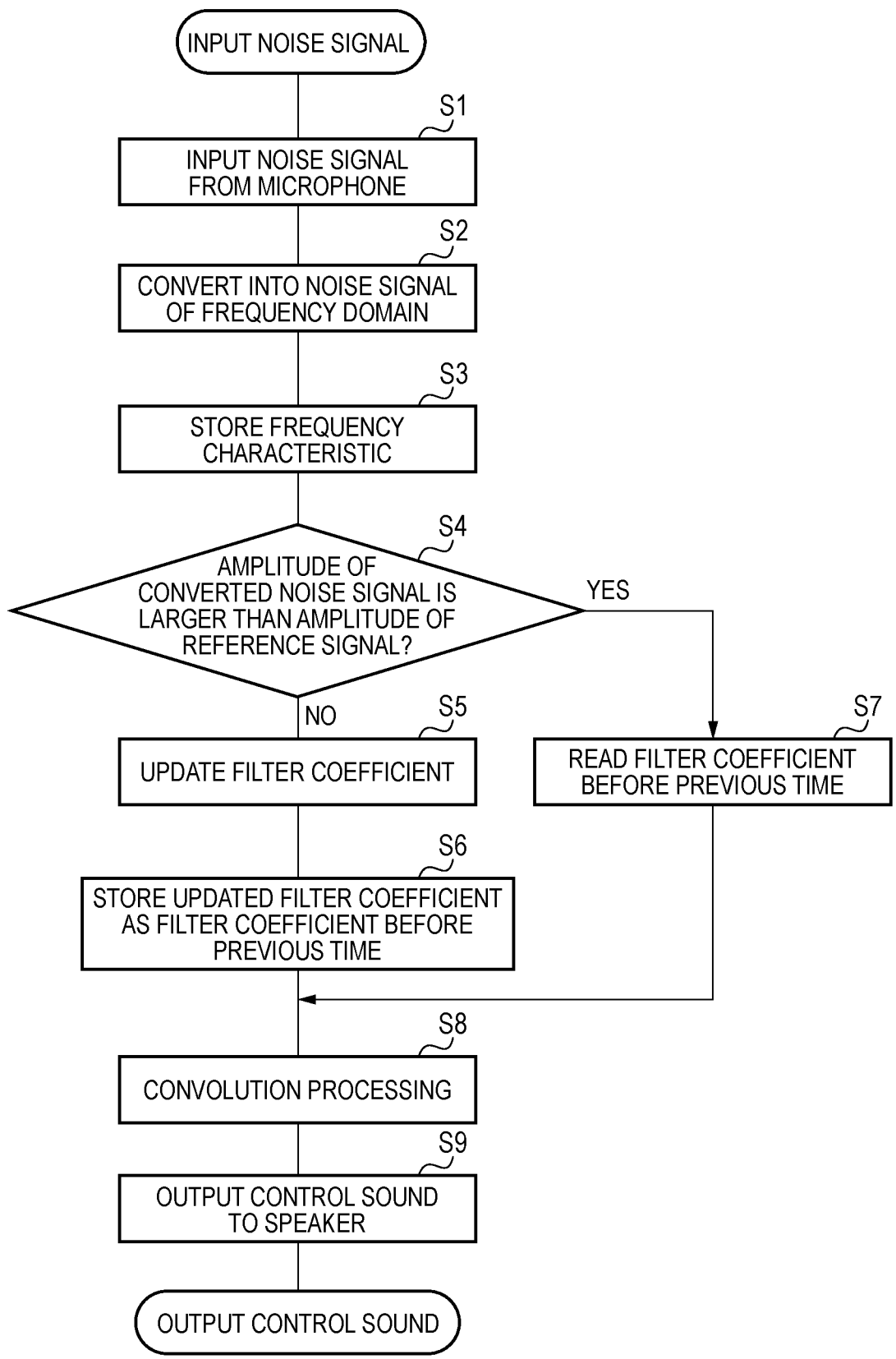
FIG. 4 is a flowchart illustrating a noise reduction processing operation according to the first embodiment.

FIG. 4 is a flowchart illustrating a noise reduction processing operation according to the first embodiment. In FIG. 4, the signal processing units 21 and 23 of the noise reduction device 10 input noise signals respectively collected by the noise microphone 30 and the error microphone 40 (S1). The signal processing units 21 and 23 convert the input noise signals in the time domain into noise signals in the frequency domain by using a well-known technique (for example, Fourier transform) (S2). The signal processing units 21 and 23 hold (update) the noise signals in the frequency domain in the storing units 22 and 24, respectively (S3).

The signal processing units 21 and 23 read frequency domain reference signals stored in the respective storing units 22 and 24, and compare amplitude of the frequency domain reference signals with amplitude of the converted noise signals in the frequency domain correspondingly. As a result of the comparison, the signal processing units 21 and 23 determine whether the amplitude of the noise signals in the frequency domain is larger than the amplitude of the frequency domain reference signals (S4).

If the amplitude of the noise signal in a frequency domain is equal to or less than the amplitude of the frequency domain reference signal (S4: NO), the adaptive filter update unit 12 updates each filter coefficient of the adaptive filter convolution unit 11 based on the noise signals respectively collected by the noise microphone 30 and the error microphone 40 (S5). The adaptive filter update unit 12 stores the updated filter coefficients in the memory 12z (S6). The adaptive filter update unit 12 may store the updated filter coefficients in the storing unit 22 or the storing unit 24. Further, the adaptive filter update unit 12 passes the updated filter coefficients to the adaptive filter convolution unit 11.

On the other hand, if frequency domain amplitude of the noise signal is larger than the frequency domain amplitude of the reference signal (S4: YES), the adaptive filter update unit 12 determines that non-stationary noise is generated, and passes filter coefficients of the time of stationary noise, which are updated at a previous time and before the previous time and are stored in the memory 12z, to the adaptive filter convolution unit 11 (S7).

The adaptive filter convolution unit 11 sets a filter coefficient received from the adaptive filter update unit 12, performs convolution processing on the noise signal collected by the noise microphone 30, and generates a control sound signal having a phase inverted from that of the noise signal (S8). The adaptive filter convolution unit 11 outputs the generated control sound signal to the speaker 50 (S9). The speaker 50 outputs a control sound, which cancels the noise signal, in the vicinity of the error microphone 40. Such an operation is continuously performed while the noise reduction device 10 is operating.

As described above, in a case where non-stationary noise louder than stationary noise is included in the noise microphone, when adaptive processing is performed in the frequency domain and noise reduction processing of updating the filter coefficient is performed in real time, the noise signal collected by the noise microphone is not used for the noise reduction processing. Accordingly, noise reduction effect of the noise reduction processing can be improved, and the divergence of the filter coefficient can be prevented. Therefore, a noise reduction operation is stabilized.

As described above, the noise reduction device 10 according to the first embodiment includes the signal processing unit 21 (an example of a processing unit) that converts a noise signal collected by the noise microphone 30 arranged in a control space into a noise signal in a frequency domain, the storing unit 22 that stores the converted noise signal in a frequency domain as a reference signal, and the adaptive filter convolution unit 11 (an example of a signal generation unit) that generates a noise reduction signal for reducing the noise signal collected by the noise microphone 30 at a control position of the control space. The signal processing unit 21 determines whether or not the noise signal collected by the noise microphone 30 is non-stationary noise generated in a non-stationary manner in the control space, by using a frequency characteristic of the converted noise signal of a frequency domain, which is converted from the noise signal collected by the noise microphone 30, and a frequency characteristic of the reference signal. When it is determined that the noise signal collected by the noise microphone 30 is non-stationary noise, the signal processing unit 21 stops updating the filter coefficient (an example of a control value related to generation of the noise reduction signal), which corresponds to the noise signal collected by the noise microphone 30, is set by the adaptive filter convolution unit 11 and is updated by the adaptive filter update unit 12 (that is, the update is omitted).

Accordingly, the noise reduction device 10 can adaptively detect the non-stationary noise generated in a non-stationary manner in a target control space of an aircraft or the like, other than the stationary noise generated therein in a stationary manner, and thus can effectively prevent deterioration in accuracy of stationary noise reduction processing.

In addition, when frequency domain amplitude of the noise signal collected by the noise microphone 30 is larger than frequency domain amplitude of the reference signal in a predetermined frequency band, the signal processing unit 21 determines that the noise signal collected by the noise microphone 30 is non-stationary noise. Accordingly, the noise reduction device 10 can easily and quickly determine that non-stationary noise of a noise level bothering a user is generated, by comparison between the noise signal collected by the noise microphone and the reference signal, in the frequency characteristic in a predetermined frequency band.

The noise reduction device 10 further includes the signal processing unit 23 (an example of a second processing unit) that converts a noise signal collected by the error microphone 40 (an example of a second microphone) disposed in the vicinity of a user's ear (an example of being near to the control position) into a noise signal in a frequency domain, and the storing unit 24 (an example of a second storage) that stores the converted noise signal in a frequency domain as a reference signal. The adaptive filter convolution unit 11 generates a noise reduction signal by using the frequency characteristics of the converted noise signals of a frequency domain, which are converted respectively by the signal processing units 21 and 23 from the noise signals collected respectively by the noise microphone 30 and the error microphone 40. Accordingly, the noise reduction device 10 can effectively generate a noise reduction signal (that is, a noise cancellation signal) so that the frequency characteristic of the noise signal collected by the error microphone 40 disposed in the vicinity of the control position, such as periphery of the user's ear or the like becomes a reference frequency characteristic.

The adaptive filter update unit 12 updates a filter coefficient of an adaptive filter in response to the noise signal collected by the noise microphone 30. The adaptive filter convolution unit 11 (adaptive filter) generates a noise reduction signal by performing convolution processing using an updated filter coefficient. The adaptive filter update unit 12 stores the updated filter coefficient in the memory 12z (or the storing unit 22). Accordingly, the noise reduction device 10 can generate a highly accurate noise reduction signal by adaptively updating the filter coefficient in response to the noise signal collected by the noise microphone. Further, the noise reduction device 10 can use the updated filter coefficient as a reference filter coefficient for generation of the noise reduction signal from the next time.

When it is determined that the noise signal collected by the noise microphone is non-stationary noise, the signal processing unit 21 causes the adaptive filter update unit 12 to omit updating the filter coefficient in response to the determined noise signal collected by the microphone, and causes the adaptive filter convolution unit 11 to generate a noise reduction signal using the filter coefficient previously stored in the storing unit 22. Accordingly, the noise reduction device 10 can prevents the divergence of the filter coefficient since updating of the filter coefficient following the non-stationary noise is stopped when the non-stationary noise is generated, and can further generate a highly accurate noise reduction signal with respect to the stationary noise by using the filter coefficient that is generated before the non-stationary noise is not generated.

The noise reduction device 10 further includes the adaptive filter divergence detection unit 13 (an example of a divergence detection unit) that detects presence or absence of divergence of the filter coefficient updated by the adaptive filter update unit 12. When divergence of the filter coefficient updated by the adaptive filter update unit 12 is detected, the adaptive filter divergence detection unit 13 outputs the filter coefficient previously stored in the memory 12z (or the storing unit 22) to the adaptive filter convolution unit 11. Accordingly, the noise reduction device 10 can generate a noise reduction signal that is adaptive to an environment of the control target space by using the previously stored filter coefficient in cases such as one where a noise level of the noise signal collected by the noise microphone is high, not limited to the case where the non-stationary noise is generated.

Second Embodiment

In the first embodiment, when the non-stationary noise is detected, the adaptive filter update unit 12 stops updating the filter coefficient, reads one of the filter coefficients of the time of stationary noise, which are updated at a previous time and before the previous time, and set the read filter coefficient to the adaptive filter convolution unit 11. In the second embodiment, a case is illustrated where the adaptive filter update unit 12 initializes the filter coefficient when non-stationary noise is detected.

A noise reduction system according to the second embodiment has substantially the same configuration as that of the first embodiment. The same components as those of the first embodiment are denoted by the same reference numerals, and a description thereof will be omitted.

Figure 5:
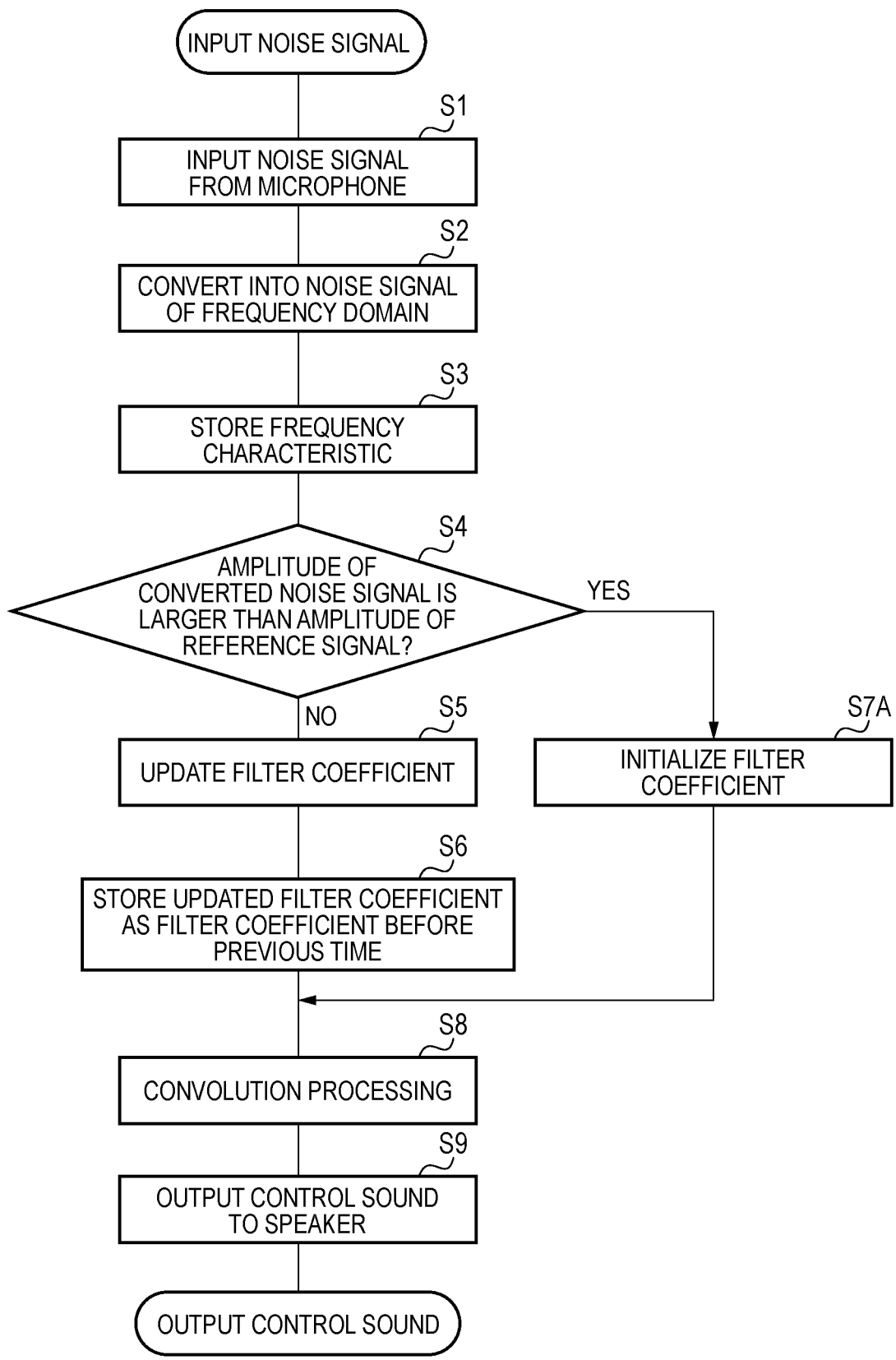
FIG. 5 is a flowchart illustrating a noise reduction processing operation according to a second embodiment.

FIG. 5 is a flowchart illustrating a noise reduction processing operation according to the second embodiment. The same steps of processing as those in the first embodiment are denoted by the same reference numerals, and a description thereof will be omitted. If the amplitude of the noise signal in a frequency domain is larger than the amplitude of the frequency domain reference signal in step S4, the adaptive filter update unit 12 initializes the filter coefficient to a value of 0 (S7A). The adaptive filter update unit 12 passes the filter coefficient set to the value of 0 to the adaptive filter convolution unit 11.

The adaptive filter convolution unit 11 sets each filter coefficient to a value of 0, and performs the convolution processing on the noise signal collected by the noise microphone 30 in step S8. In this case, the adaptive filter convolution unit 11 outputs a control sound signal that is silence even when the noise signal is input from the noise microphone 30. Therefore, no sound is output from the speaker 50. Other steps of processing are the same as those of the first embodiment.

Although the filter coefficient is set to the value of 0 at the time of initialization, a filter coefficient determined in advance, for example, a general-purpose filter coefficient suitable in the aircraft, may be set for the initialization.

As described above, in the noise reduction device 10 according to the second embodiment, when it is determined that the noise signal collected by the noise microphone 30 is non-stationary noise, the signal processing unit 21 causes the adaptive filter convolution unit 11 to initialize the filter coefficient in response to the noise signal collected by the noise microphone 30.

Accordingly, when the non-stationary noise is generated, the noise reduction device 10 can temporarily stop the output of the noise reduction sound from the speaker by initializing the filter coefficient. Further, since the update of the filter coefficient following the non-stationary noise stops, the divergence of the filter coefficient can be prevented.

Third Embodiment

In the first and second embodiments, the noise collected by the noise microphone is subjected to frequency conversion, and it is determined whether or not the noise is non-stationary noise in the frequency domain. In the third embodiment, a case is illustrated where whether or not the noise is non-stationary noise in a time domain, in which a load of processing is relatively small, is determined before whether or not the noise is non-stationary noise in the frequency domain, in which a load of processing is large, is determined.

A noise reduction system of the third embodiment has substantially the same configuration as that of the first embodiment. The same components as those of the first embodiment are denoted by the same reference numerals, and a description thereof will be omitted.

Figure 6:
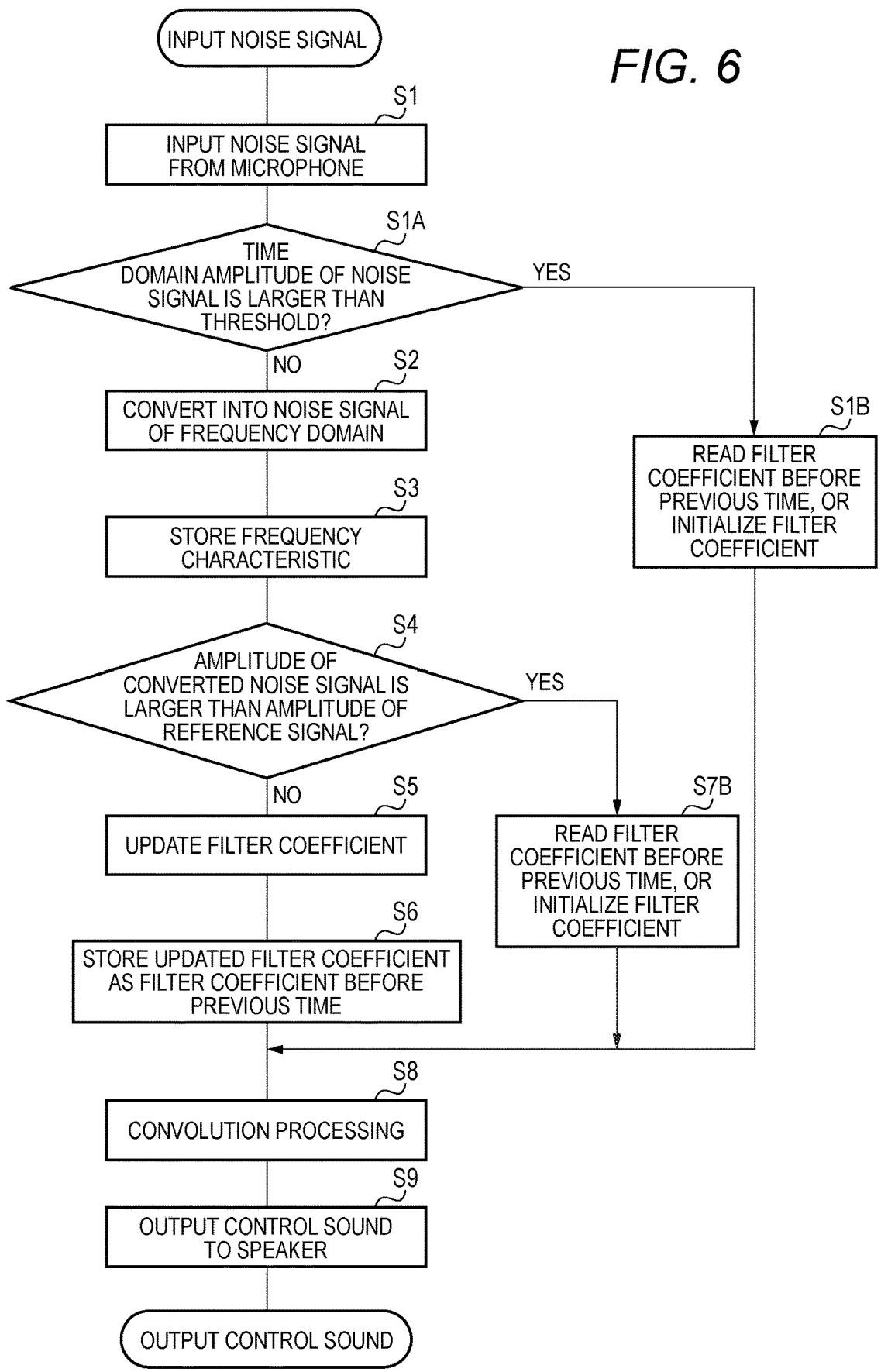
FIG. 6 is a flowchart illustrating a noise reduction processing operation according to a third embodiment.

FIG. 6 is a flowchart illustrating a noise reduction processing operation according to the third embodiment. The same steps of processing as those in the first embodiment are denoted by the same reference numerals, and a description thereof will be omitted. The signal processing units 21 and 23 of the noise reduction device 10 input noise signals respectively collected by the noise microphone 30 and the error microphone 40 in step S1. The signal processing units 21 and 23 read amplitude (an example of a threshold) of a reference signal in the time domain stored by the storing units 22 and 24, and compare the threshold with the collected noise signals correspondingly. As a result of the comparison, the signal processing units 21 and 23 determine whether or not the amplitude of the collected noise signals is larger than the threshold (S1A).

When the amplitude of the collected noise signals is larger than the threshold, the adaptive filter update unit 12 sets a filter coefficient of the adaptive filter to a filter coefficient of the time of stationary noise which is updated at a previous time or before the previous time, or initializes the filter coefficient of the adaptive filter to a value of 0 (S1B). The adaptive filter update unit 12 passes the filter coefficient set in step S1B to the adaptive filter convolution unit 11. Setting the filter coefficient to the filter coefficient of the time of stationary noise which is updated at a previous time or before the previous time is the same as that in the first embodiment. In addition, initializing the filter coefficient to the value of 0 is the same as that in the second embodiment. After the processing of step S1B, the noise reduction device 10 performs the processing of step 8 and subsequent steps as in the first embodiment.

On the other hand, if the amplitude of the collected noise signals is equal to or lower than the threshold in step S1A, the noise reduction device 10 performs the processing of step S2 and subsequent steps as in the first embodiment in order to perform determination in the frequency domain. If the amplitude of the noise signal in a frequency domain is larger than the amplitude of the reference signal in the frequency domain in step S4, the adaptive filter update unit 12 determines that non-stationary noise is generated. In this case, as in step S1B, the adaptive filter update unit 12 sets the filter coefficient to a filter coefficient of the time of stationary noise which is updated at a previous time or before the previous time, or initializes the filter coefficient to a value of 0 (S7B). After the processing of step S7B, as in the first embodiment, the noise reduction device 10 performs the processing of step 8 and subsequent steps.

As described above, in the noise reduction device 10 according to the third embodiment, when the time domain amplitude of the noise signal collected by the noise microphone 30 is larger than the predetermined threshold, the signal processing unit 21 determines that the noise signal collected by the noise microphone 30 is non-stationary noise.

Accordingly, the noise reduction device 10 can easily determine whether or not a loud sound (for example, an abnormal sound) is generated suddenly in a target control space of an aircraft or the like, and thus can easily and quickly determine that non-stationary noise of a noise level bothering a user is generated.

The signal processing unit 21 compares the time domain amplitude of the noise signal collected by the noise microphone 30 with the threshold, acquires a comparison result of a case where the time domain amplitude of the noise signal is equal to or less than the threshold, and thereafter compares the frequency domain amplitude of the noise signal with the frequency domain amplitude of the reference signal. When the frequency domain amplitude of the noise signal is larger than the frequency domain amplitude of the reference signal, the signal processing unit 21 determines that the noise signal is non-stationary noise. Accordingly, when the noise reduction device 10 determines the noise signal to be non-stationary noise by performing the processing of the time domain earlier, the processing of the frequency domain with a large load can be omitted, and a load of the signal processing unit 21 can be reduced.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the above-described embodiments may be combined freely within a range not departing from the spirit of the invention.

For example, although a case where the noise reduction device is installed in the vicinity of the seat in the aircraft is illustrated in the various embodiments described above, the present invention is not limited thereto, and the noise reduction device may be installed in the vicinity of a seat of a mobile entity, including a train, a ship, and a vehicle such as a bus and a taxi.

This application is a continuation of PCT application No. PCT/JP2019/006660, which was filed on Feb. 21, 2019 based on Japanese Patent Application No. 2018-069460 filed on Mar. 30, 2018, the contents of which are incorporated herein by reference.

The present disclosure is useful as a noise reduction device that adaptively detects non-stationary noise generated in a non-stationary manner in a control space of an aircraft or the like, other than stationary noise generated therein in a stationary manner, and that effectively prevents deterioration in accuracy of stationary noise reduction processing.

What is claimed is:

1. A method for preventing deterioration in noise reduction, the method comprising:
   collecting a noise signal on at least one output channel in response to an input;
   generating a signal of noise reduction sound based in part on a filter coefficient of an adaptive filter, the signal of noise reduction sound being radiated by a speaker as noise reduction sound within a control position;
   comparing an amplitude of the signal of the noise reduction sound to an amplitude of a reference signal;
   determining a process for the adaptive filter on the filter coefficient based in part on a result of the comparing of the amplitude of the signal of the noise reduction sound to the amplitude of the reference signal;

detecting a non-stationary noise based on the noise signal based on the result of the comparing of the amplitude of the signal of the noise reduction sound to the amplitude of the reference signal; and setting the process for the adaptive filter on the filter coefficient as forwarding the filter coefficient unchanged from a previous value, in response to detecting the non-stationary noise.

2. The method of claim 1, wherein the setting of the process for the adaptive filter further comprises cancelling updating of the filter coefficient.

3. The method of claim 1, wherein the setting of the process for the adaptive filter further comprises initializing the filter coefficient.

4. The method of claim 1, wherein the setting of the process for the adaptive filter further comprises changing the filter coefficient to a general-purpose filter.

5. A noise reduction system comprising:
a noise detector adapted to collect a noise signal on at least one output channel in response to an input;
a signal generator configured to generate a signal of noise reduction sound based in part on a filter coefficient of an adaptive filter, the signal of noise reduction sound being radiated by a speaker as noise reduction sound within a control position; and
a processor configured to:
compare an amplitude of the signal of the noise reduction sound to an amplitude of a reference signal,
determine a process for the adaptive filter on the filter coefficient based in part on a result of the comparing the amplitude of the signal of the noise reduction sound to the amplitude of the reference signal,
detect a non-stationary noise based on a characteristic of the noise signal in a frequency domain based on the result of the comparing of the amplitude of the signal of the noise reduction sound to the amplitude of the reference signal, and
set the process for the adaptive filter on the filter coefficient as forwarding the filter coefficient unchanged from a previous value, in response to detecting the non-stationary noise.

6. The noise reduction system of claim 5, wherein the processor is further configured to set the process of the adaptive filter as canceling of updating of the filter coefficient.

7. The noise reduction system of claim 5, wherein the processor is further configured to set the process of the adaptive filter as initializing the filter coefficient.

8. The noise reduction system of claim 5, wherein the processor is further configured to set the process of the adaptive filter as changing the filter coefficient to a general-purpose filter.

9. The method of claim 1, wherein the detecting of the non-stationary noise is based on comparing a frequency domain amplitude of the noise signal to a frequency domain amplitude of a reference signal.

10. The method of claim 1, wherein the detecting of the non-stationary noise is based on detecting a non-stationary noise based on a characteristic of the noise signal in a frequency domain.

* * * * *